United States Patent
Nishimura

(10) Patent No.: US 7,468,875 B2
(45) Date of Patent: Dec. 23, 2008

(54) PLASMA TELEVISION AND POWER SUPPLY CONTROL DEVICE

(75) Inventor: Shoichiro Nishimura, Osaka (JP)

(73) Assignee: Funai Electric Co., Ltd., Dalto-shi, Osaka (JP)

( * ) Notice: Subject to any disclaimer, the term of this patent is extended or adjusted under 35 U.S.C. 154(b) by 0 days.

(21) Appl. No.: 11/644,369

(22) Filed: Dec. 21, 2006

(65) Prior Publication Data

US 2007/0146949 A1 Jun. 28, 2007

(30) Foreign Application Priority Data

Dec. 26, 2005 (JP) ............................ 2005-372259

(51) Int. Cl.
*H02H 3/20* (2006.01)
(52) U.S. Cl. .................... 361/90; 361/91.1; 361/92; 361/111; 345/211
(58) Field of Classification Search .............. 361/90, 361/111; 345/211
See application file for complete search history.

(56) References Cited

U.S. PATENT DOCUMENTS 4,855,892 A * 8/1989 Lower ........................ 363/86
6,710,550 B2 * 3/2004 Bang ....................... 315/169.4
2005/0001793 A1 * 1/2005 Chung et al. .................. 345/60

FOREIGN PATENT DOCUMENTS

| JP | 04-079583 | | 3/1992 |
| JP | 2000-092844 A | * | 9/1998 |
| JP | 10-327372 | | 12/1998 |
| JP | 3087790 U | | 5/2002 |

* cited by examiner

*Primary Examiner*—Michael J Sherry
*Assistant Examiner*—Tien Mai
(74) *Attorney, Agent, or Firm*—Yokoi & Co., U.S.A., Inc.; Peter Ganjian

(57) ABSTRACT

A microcomputer 60 takes in voltages output from the sustaining voltage Vsus generation circuit 52, the addressing voltage Vadd generation circuit 53, and the standby voltage generating circuit 54 via A/D input ports 1 through 6 mounted on the microcomputer board, and performs examinations to judge whether abnormal values are detected about the voltages. If there is at least one abnormal value detected, the main power supply is set OFF and after a predetermined time the main power supply is set ON again to perform a reexamination. If the number of times when abnormal values about a certain voltage are detected reaches the number of abnormal value detections N, the main power supply is left OFF. The number of abnormal value detections N for the Vsamp, the Vset, the Ve or the Vscan, is set larger than the number of abnormal value detections set for the Vsus or the Vadd.

3 Claims, 4 Drawing Sheets

PLASMA TELEVISION AND POWER SUPPLY CONTROL DEVICE

CROSS-REFERENCES TO RELATED APPLICATIONS

The present application is related to the Japanese Patent Application No. 2005-372259, filed Dec. 26, 2005, the entire disclosure of which is expressly incorporated by reference herein.

BACKGROUND OF THE INVENTION (1) Field of the Invention

The present invention relates to a plasma television and a power supply control device.

(2) Description of the Related Art

One well known conventional prior art method to protect a television receiver, is to prohibit the main power supply of a microcomputer from being set to ON after the number of protection operations to set the main power supply to OFF reaches a predetermined number (Refer to Japanese Patent Laid-Open No. H4-79583).

Another well known prior art method for protection of a television receiver is to set a switching circuit of a television to OFF when noises are detected for a predetermined time in the main body of the television receiver (Refer to Japan Utility Model Publication No. 3087790).

Still a further well known prior art method for protection of a television receiver is to disable a high voltage output circuit when the number of judgments that examine the duration of an abnormal state detection signal with preset time intervals reaches the predetermined number (Refer to Japanese Patent Laid-Open No. H10-327372).

In above-mentioned prior arts, measures are adapted that prevent a protection target apparatus from shutting off the power supply when noises temporally flow in the apparatus.

In apparatuses, such as television sets, it is required that the main power supplies be shut off when abnormal voltage values are detected due to some circuit malfunction within the apparatus, which prevents abnormal voltages from flowing in a display panel. However, in general, the main power supplies are generally not shut off when the abnormal voltages that are detected are due to temporal inflow of noises. Judgment as to whether the detection of abnormal voltage values is due to a real malfunction or due to simple inflow of noises can be made accurately by repeating the above-mentioned detection process.

Among various circuits that constitute an apparatus, the malfunctions of some circuits may directly cause the failure of the above-mentioned display panel, and the malfunctions of other circuits may indirectly cause the failure of the above-mentioned display panel. Therefore, there are various circuits with different malfunction severities mixed in an apparatus. However, attention is not paid to the different malfunction severities of various portions that constitute an apparatus.

Therefore, there is an inappropriate case where the hasty decision is made to shut off a power supply of an apparatus even though there is enough time to determine if the detection of abnormal voltage values have been due to a real malfunction or due to simple inflow of noises. Further, there is another inappropriate case where the above-mentioned detection process may be repeated many times despite the urgency to shut off the power supply at once, with the adverse effect caused by actual malfunction of a circuit.

BRIEF SUMMARY OF THE INVENTION

The present invention discloses the combination of a plasma television set and a power supply control device that can prevent an apparatus from breaking down and avoid unnecessary shutting off of a power supply.

One aspect of the present invention provides a power supply control device that sets a main power supply OFF when malfunctions occur to portions targeted for examination, comprising: a detection unit that detects abnormal values of output voltages that are obtained from portions targeted for examination when the main power supply is ON; a power switching circuit that sets the main power supply OFF when the detection unit detects at least one abnormal value from any output voltage and sets the main power supply ON again after a predetermined time; and a switching control unit that controls the power switching circuit. The number of abnormal value detections that is set for each of the output voltages and is used for making the determination that a malfunction has occurred in the corresponding portion targeted for examination is stored in advance. If the number of detected occurrences of abnormal values about a specified output voltage that are detected by the detection unit reaches the number of abnormal value detections that is set for the output voltage, the power switching circuit is prohibited from setting the main power supply to ON again when a predetermined time has elapsed since the power switching circuit set the main power supply OFF.

In the present invention, the detection unit and the power switching circuit repeat the above mentioned operation. However, the main power supply is maintained ON if no abnormal voltage value is detected.

Depending on the output voltage determined to be abnormal, the switching control unit changes the timing of the above-mentioned repeated operation. In other words, the switching control unit determines the number of abnormal voltage value detections for each of the output voltages, and if that number reaches a number of abnormal voltage value detections set in advance for the specified output voltage, the switching control unit prohibits the power switching circuit from setting the main power supply to ON after the predetermined time has elapsed. The elapsed time may be counted since the power switching circuit set the main power supply to OFF.

As mentioned above, one aspect of the present invention provides setting the number of abnormal voltage value detections for each of the output voltages individually. The number of abnormal voltage value detections set for each of the output voltages is used during the repeated process where the main power supply is set to OFF when an abnormal value is detected and again set to ON after a predetermined time, where the abnormal value detection is continued.

Therefore, for those output voltages with abnormal values that may cause serious damages, the determination that the main power supply should remain OFF can be made at the early time. In consequence, serious failures due to malfunctions of the portions of the apparatus targeted for examination can be prevented from occurring. On the other hand, for those output voltages with abnormal values that may not cause serious damages, the determination as to whether the abnormal values are due to a real malfunction or due to temporal inflow of noises can be accurately made through a plurality of abnormal value detections, resulting in the right determination if the main power supply should be left OFF.

An optional aspect of the present invention provides a power supply control device, wherein: the detection unit detects abnormal values of the output voltages that are obtained from an addressing voltage generation portion, a sustaining voltage generation portion, and a standby voltage generation portion that generate voltages fed to a plasma display panel; and the number of abnormal value detections related to an addressing voltage output from the addressing voltage generation portion and a sustaining voltage output from the sustaining voltage generation portion that are stored in the switching control unit is set to 2.

In other words, in this aspect of the present invention, these three voltage generation portions are targeted for the abnormal value detection. In the case where the addressing voltage or the sustaining voltage shows an abnormal value due to a malfunction of the addressing voltage generation portion or the sustaining voltage generation portion, this has the potential to cause great damage to the plasma display. Therefore, the avoidance of damage to the plasma display is given priority over the judgment whether the abnormal value is due to a malfunction or due to temporal noises. The numbers of abnormal value detections related to an addressing voltage and a sustaining voltage are limited to 2, resulting in the early shutting off of the main power supply.

Another optional aspect of the present invention provides a power supply control device, wherein the number of abnormal value detections related to the output voltages from the standby voltage generation portion and a specified examination voltage from the sustaining voltage generation portion that are stored in the switching control unit is set to a number larger than the numbers of abnormal values detections related to the addressing voltage and sustaining voltage.

The output voltages from the standby voltage generation portion and the specified examination voltage from the sustaining voltage generation portion have the low potential to cause damage to the plasma display even if their values are abnormal. Therefore, the numbers of the abnormal values detections related to these voltages are set larger and the judgment whether the abnormal values are due to malfunctions or due to temporal noises can be cautiously decided. As a consequence, the false operation, where the main power supply is shut off even if there is no need to stop the main power supply because the abnormal values are due to temporal noises, can be prevented.

Another optional aspect of the present invention provides a power supply control device, wherein the detection unit obtains the voltage values that are received after the output voltages from the portions targeted for examination have been individually divided and stepped down.

In other words, the voltage values output from the portions targeted for examination are high, such as 176 V, therefore, only after being stepped down to lower level voltages, for example lower than 5 V, these voltages are input to the detection unit, and the detection unit makes the determination if the original values are abnormal values based on these stepped down values.

Another aspect of the present invention provides a plasma television set that sets a main power supply OFF when malfunctions occur to circuits targeted for examination, comprising: a rectifier circuit that generates DC voltage by rectifying an input AC voltage; an addressing voltage generation circuit that generates an addressing voltage across a secondary winding of an embedded transformer with the DC voltage applied to a primary winding of the embedded transformer. The addressing voltage generation circuit outputs the addressing voltage to a plasma display panel. A sustaining voltage generation circuit that generates a sustaining voltage and a specified examination voltage that have different voltage levels from each other using two different tapping wires from a secondary winding of another embedded transformer with the DC voltage applied to a primary winding of the embedded transformer. The sustaining voltage generation circuit outputs the sustaining voltage to the plasma display and outputs the examination voltage to the outside. A standby voltage generation circuit that generates a first erasing voltage, a second erasing voltage, and a scanning voltage that have different voltage levels from each other using three different tapping wires from a secondary winding of another embedded transformer with the above mentioned DC voltage applied to a primary winding of the embedded transformer. The standby voltage generation circuit outputs the first erasing voltage, the second erasing voltage and the scanning voltage to the plasma display. A relay circuit, located in front of the rectifier circuit, that switches the state of a main power supply ON or OFF by switching between supply of AC voltage and cutting off of AC voltage to the rectifier circuit. A microcomputer, equipped with a plurality of A/D input ports for the addressing voltage, the sustaining voltage, the examination voltage, the first erasing voltage, the second erasing voltage and the scanning voltage individually. The microcomputer controls the relay circuit to set the main power supply OFF if any one of the input voltages are abnormal after examining each input voltage, and again controls the relay circuit to set the main power supply to ON after 1 or 2 seconds. The microcomputer stores in advance the number of abnormal value detections that is set for each of the voltages input to A/D ports, which are used for making the determination if a malfunction has occurred in the corresponding circuit. If the number of abnormal voltage detections related to the addressing voltage or the sustaining voltage reaches 2, or if the number of abnormal voltage detections related to the examination voltage, the first erasing voltage, the second erasing voltage or the scanning voltage reaches 3, the microcomputer controls the relay circuit to set the main power supply OFF. This prohibits the relay circuit from setting the main power supply ON again after the predetermined time elapsed. The addressing voltage, the sustaining voltage, the examination voltage, the first erasing voltage, the second erasing voltage and the scanning voltage are input to the corresponding A/D ports after being individually divided and stepped down.

The above-mentioned techniques can be applicable to a specific product such as a plasma television, methods, or implemented as programs that are executed by a computer.

The present invention can provide one function to prevent the apparatus from breaking down due to malfunctions and another function to avoid unnecessary shutting off of the power supply due to the following measures:

(1) The numbers of abnormal value detections are individually set for the output voltages from portions (circuits) targeted for examination commensurate with the type of malfunctions of the portions (circuits) targeted for examination and the level of resulting failure of the apparatus due to those malfunctions.

(2) The above mentioned numbers of abnormal value detections are used for to determine if the abnormal values output from portions (circuits) targeted are due to the malfunctions of the portions (circuits) targeted or due to temporal inflow of noises. In other words, if the number of abnormal values detected for any output voltage reaches the number of abnormal value detections set for the output voltage, the determination can be made if the abnormal value is due to the malfunctions.

(3) If a determination is made that the abnormal values are due to the malfunctions, the main power supply is maintained OFF.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
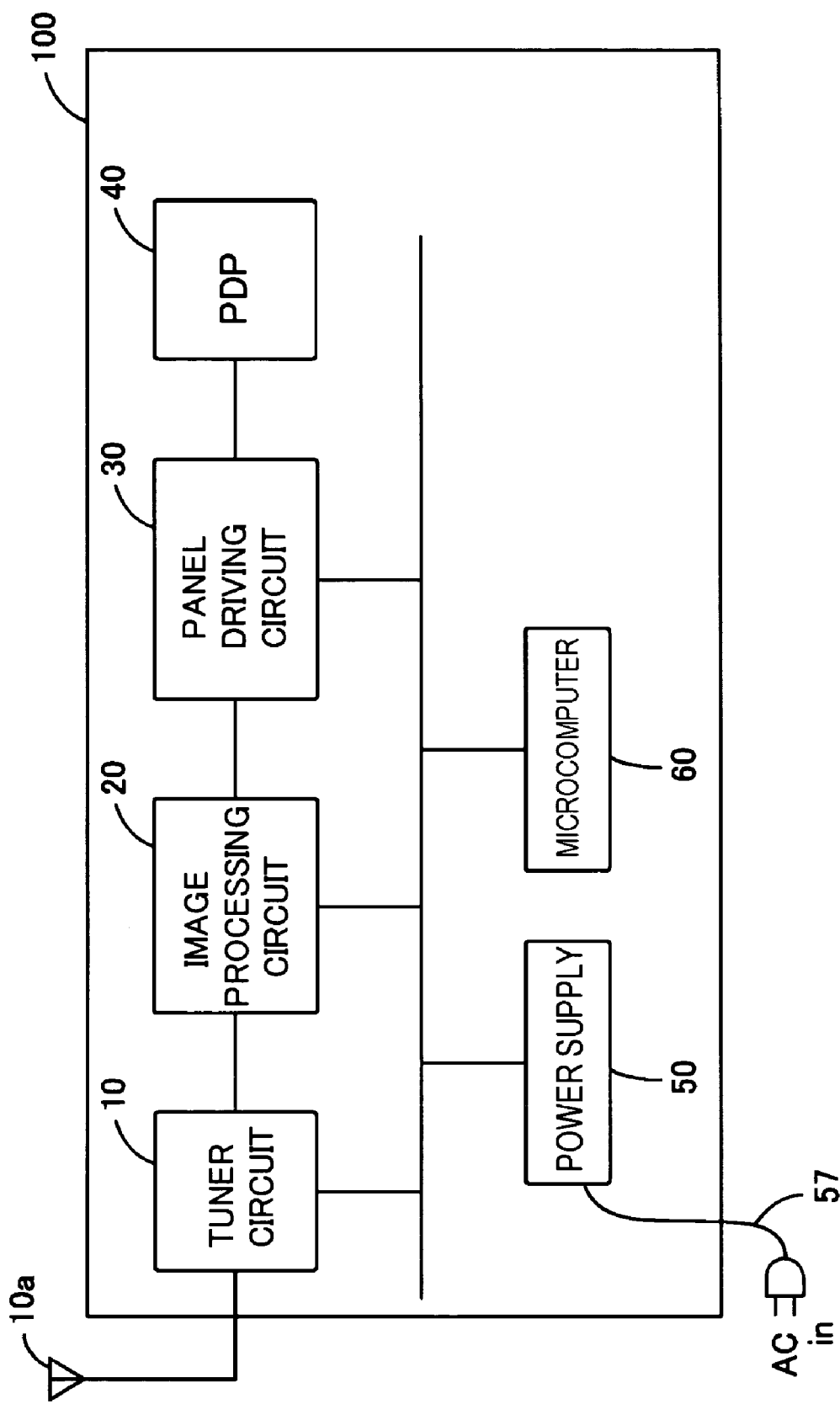
FIG. 1 is an exemplary illustration of a block diagram showing a schematic configuration of a plasma television set in accordance with the present invention.

An embodiment of the present invention will be described in the following sequence:

(1) Configuration of a plasma television
(2) Configuration of a power supply circuit and others
(3) Concrete contents of a power supply control processing
(4) Conclusion (1) Configuration of Plasma Television Set FIG. 1 is a block diagram showing a schematic configuration of a plasma television set related to the present invention.

As shown in FIG. 1, the plasma television set 100 is mainly composed of a plasma display panel (PDP for short hereafter) 40, an image processing circuit 20, a tuner circuit 10, a microcomputer 60, a panel driving circuit 30, and a power supply circuit 50. The tuner circuit 10 obtains TV broadcast waves through an antenna 10a and extracts image signals etc. from the TV broadcast waves within the frequency bandwidth specified by the microcomputer 60. Equipped with an program executing environment composed of embedded CPU, ROM and RAM, the microcomputer 60 controls the whole behavior of the plasma television set 100. In addition, the microcomputer 60 can also perform a power supply control processing to be described later as one of its functions.

The image processing circuit 20 generates digital image signals based on image signals input by the tuner circuit 10. The digital image signals generated by the image processing circuit 20 is input to the panel driving circuit 30, and this panel driving circuit 30 generates driving signals for PDP 40 based on the digital image signals.

Through the above-mentioned configuration, images based on the TV broadcast waves can be reproduced on PDP 40. It should be appreciated by those skilled in the art that the plasma television set 100 can reproduce images from TV image signals of Cable TV (CATV) or from image signals input by a DVD video deck and the like as well as image signals received by the antenna 10. TV broadcast waves that are input to the tuner circuit 10 can be either digital or analog, so long as the image processing circuit 20 is compatible with incoming signals.

The power supply circuit 50 takes in commercial alternative voltage AC through a power cable 57 and generates a sustaining voltage Vsus, an addressing voltage Vadd, a first erasing voltage Vset, a second erasing voltage Ve, and a Scanning voltage Vscan as power supply voltages to drive PDP 40. In addition, the power supply circuit 50 supplies necessary powers not only to PDP 40 but also to the microcomputer 60 and to other circuits that compose the plasma television set 100.

The sustaining voltage Vsus and the addressing voltage Vadd are respectively fed to sustaining electrodes and addressing electrodes of many cells with which PDP 40 is equipped, while the scanning voltage Vscan is fed to scanning electrodes of the many cells. In one embodiment of the present invention, the PDP 40 utilizes a surface discharge method wherein discharges occurs in the direction of the display surface of the PDP 40 by applying pulse voltages to the scanning electrodes and sustaining electrodes of cells that were pre-discharged across the addressing electrodes. The first erasing voltage Vset and the second erasing voltage Ve are used to erase electric charges that may remain in the cells. The above-mentioned voltages are output to PDP 40 in a specific order and time sequence after the plasma display 100 is started up.

(2) Configuration of Power Supply Circuit and Others

Figure 2:
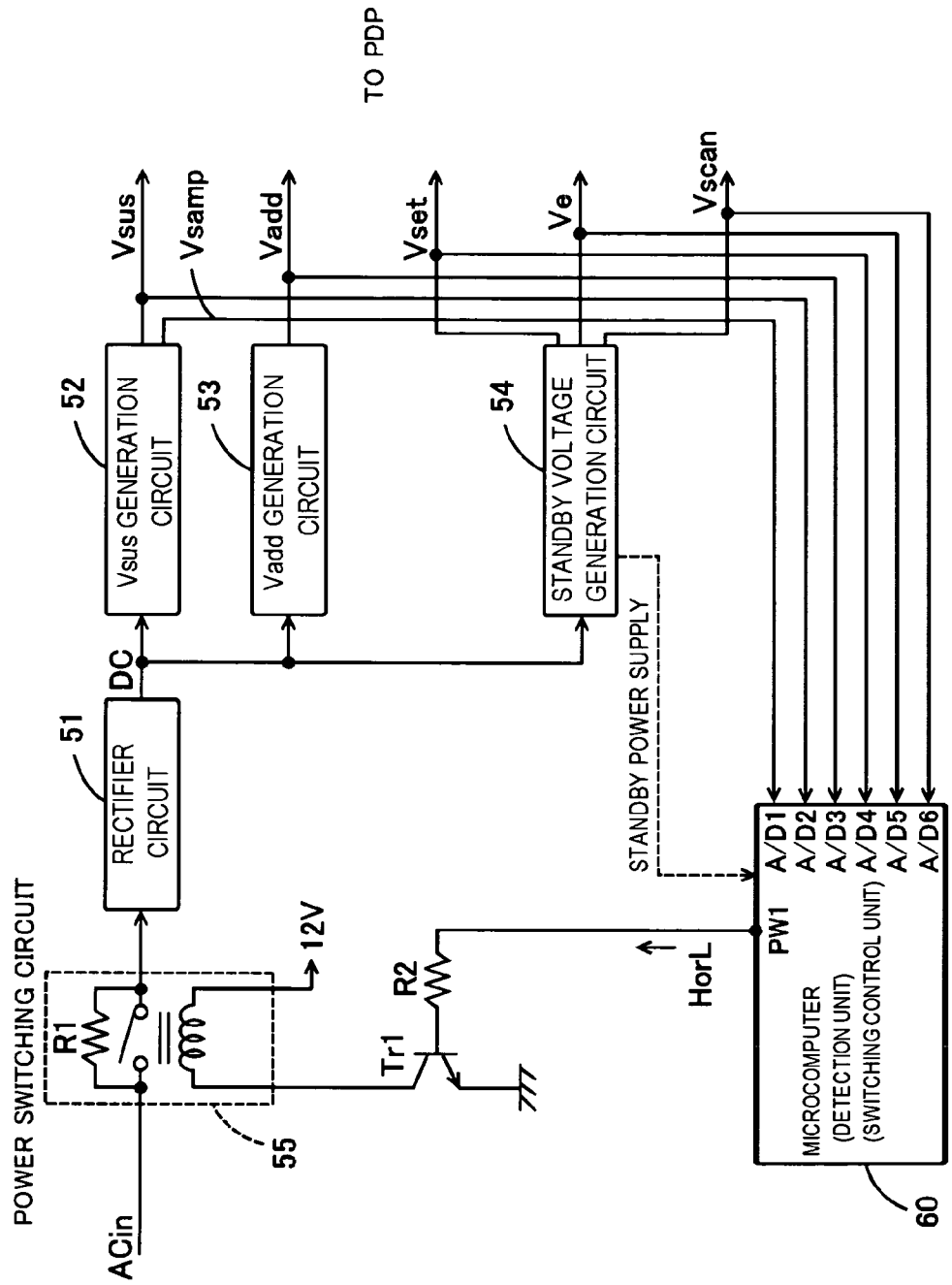
FIG. 2 is an exemplary illustration of a block diagram showing a configuration, amongst others, of a power supply circuit in accordance with the present invention.

FIG. 2 is a block diagram showing, amongst others, the power supply circuit 50 and the microcomputer 60.

In the power supply circuit 50, a rectifier circuit 51 takes in alternative voltage AC and converts this alternative voltage AC to a direct current voltage DC with a preset level (385 V for example). The generated direct current voltage DC is parallel fed to a sustaining voltage Vsus generation circuit 52, an addressing voltage Vadd generation circuit 53, and a standby voltage generation circuit 54. Each of the voltage generation circuits 52 through 54 have one or more embedded transformers with specific turn ratios. The direct current DC is input to the primary windings of the one or more embedded transformers, with the voltage generation circuits generating the sustaining voltage Vsus, the addressing voltage Vadd, the first erasing voltage Vset, the second erasing voltage Ve, and the scanning voltage Vscan with desirable voltage levels across the secondary windings of the respective one or more embedded transformers.

Figure 3:
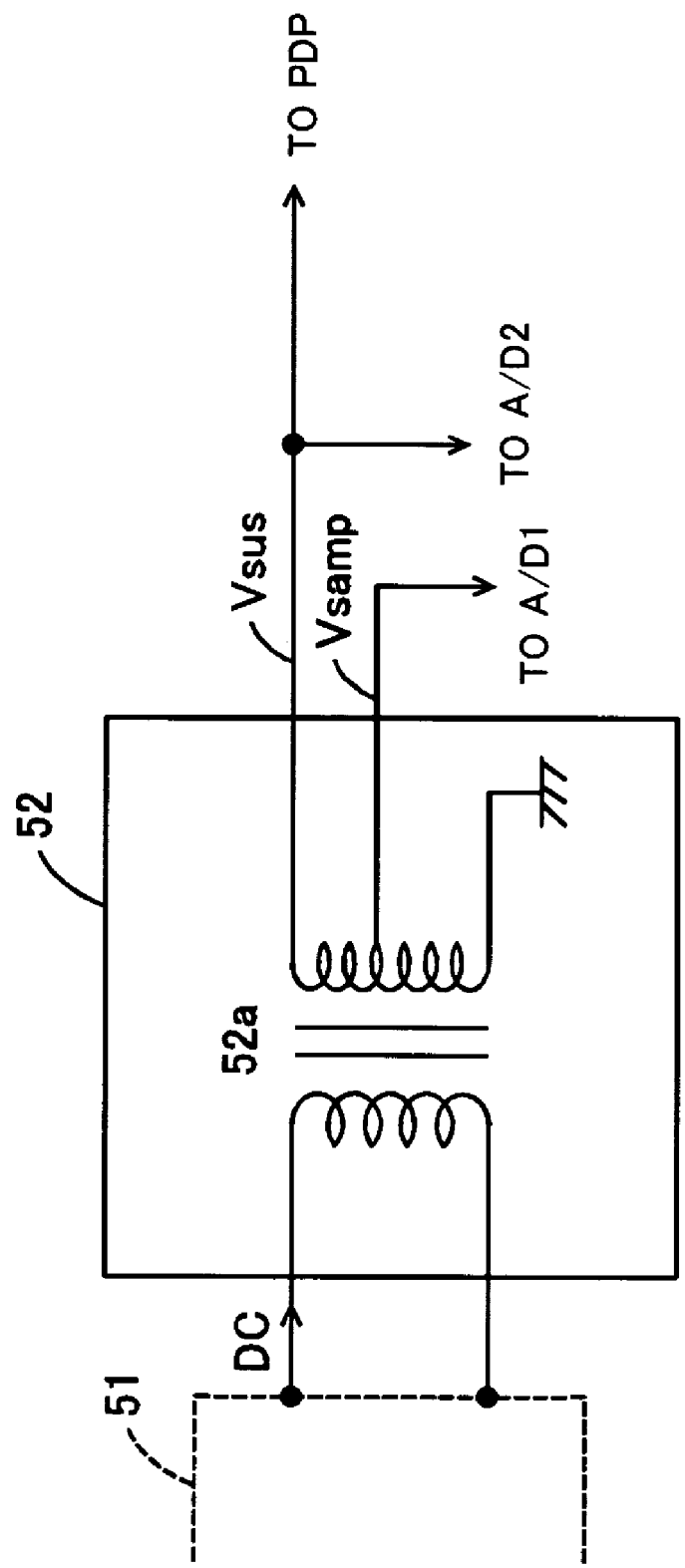
FIG. 3 is an exemplary illustration of a drawing showing an internal structure of a sustaining voltage generation circuit in accordance with the present invention.

FIG. 3 exemplarily shows an internal structure of the sustaining voltage generation circuit 52.

As illustrated, the direct current voltage DC output from the rectifier circuit 51 is applied to a terminal of a first winding of a transformer 52a. A secondary winding of the transformer 52a has two different tapping wires that generate two different voltages, one of which is the sustaining voltage Vsus, with the output voltage of Vsus adjusted to 176V, and as stated above, fed to PDP 40.

The other DC voltage output from the other tapping wire is an examination voltage Vsamp, with the output adjusted to a preset value (−0.5 V for example). When the direct current Voltage DC output from the rectifier circuit 51 has a stable voltage level 358 V, the examination voltage Vsamp will also have a stable voltage value, that is, the preset value. However, if the direct current Voltage DC has an unstable voltage value, Vsamp will also have an unstable voltage value. In other words, the examination voltage Vsamp is a voltage for determining if the rectifier circuit 51 has any malfunction. It should be noted that the examination voltage Vsamp is not fed to PDP 40, but fed to the microcomputer 60 to determine if the level of the examination voltage Vsamp is normal, the details of which are described below.

The standby voltage generation circuit 54 also includes an embedded transformer with a secondary winding having three different tapping wires. Each tapping wire generates a different voltage with one generating the first erasing voltage Vset, the other generating the voltage Ve, and finally the last tap generating the scanning voltage Vscan, all of which are output and fed to PDP 40.

Referring back to FIG. 2, as shown, the microcomputer 60 is equipped with a plurality of analog-to-digital converter (A/D) input ports A/D1 through A/D6 to obtain output voltages from the above-mentioned generation circuits 52 through 54. In particular, input port A/D1 receives the examination voltage Vsamp, input port A/D2 receives the sustaining voltage Vsus, and input port A/D3 receives the addressing voltage Vadd. Additionally, the input port A/D4 receives the first erasing voltage Vset, the input port A/D5 receives the second erasing voltage Ve, and finally the input port A/D6 receives the scanning voltage Vscan. The received analog voltages are then converted to digital to be processed by the microcomputer 60. It should be noted that the output voltages from above-mentioned generation circuits 52 through 54 are input to the respective A/D input ports only after their voltage levels are lowered by resistive voltage dividers (not shown).

As further illustrated in FIG. 2, a relay circuit 55 is coupled with the rectifier circuit 51. The microcomputer 60 outputs a switching signal from a port PW1 for setting a switch of the relay circuit 55 ON or OFF in order to respectively enable or disable a main power supply. More specifically, a switching transistor Tr1 is controlled by the microcomputer 60, and used for driving a relay coil of the relay circuit 55. The switching transistor Tr1 is coupled between the microcomputer 60 and the relay circuit 55, with the microcomputer 60 applying the switching signal to the transistor Tr1. If the switching signal is high (H), the switch of the relay circuit 55 is set to ON to enable the supply of power from the main power supply, and if the switching signal is low (L), the switch of the relay circuit 55 is set to OFF to disable the main power supply. A resistor R1 is coupled in parallel with the switch in the relay circuit 55 so that an input terminal of a power switching circuit and an output terminal of the power switching circuit is connected through the resistor R1 with the result that a standby power supply voltage with a certain voltage level is fed to the microcomputer 60, even if the switch of the relay circuit 55 is OFF. The standby power supply voltage is input to the microcomputer 60 via the standby generation circuit 54.

(3) Concrete Contents of a Power Supply Control Processing

Figure 4:
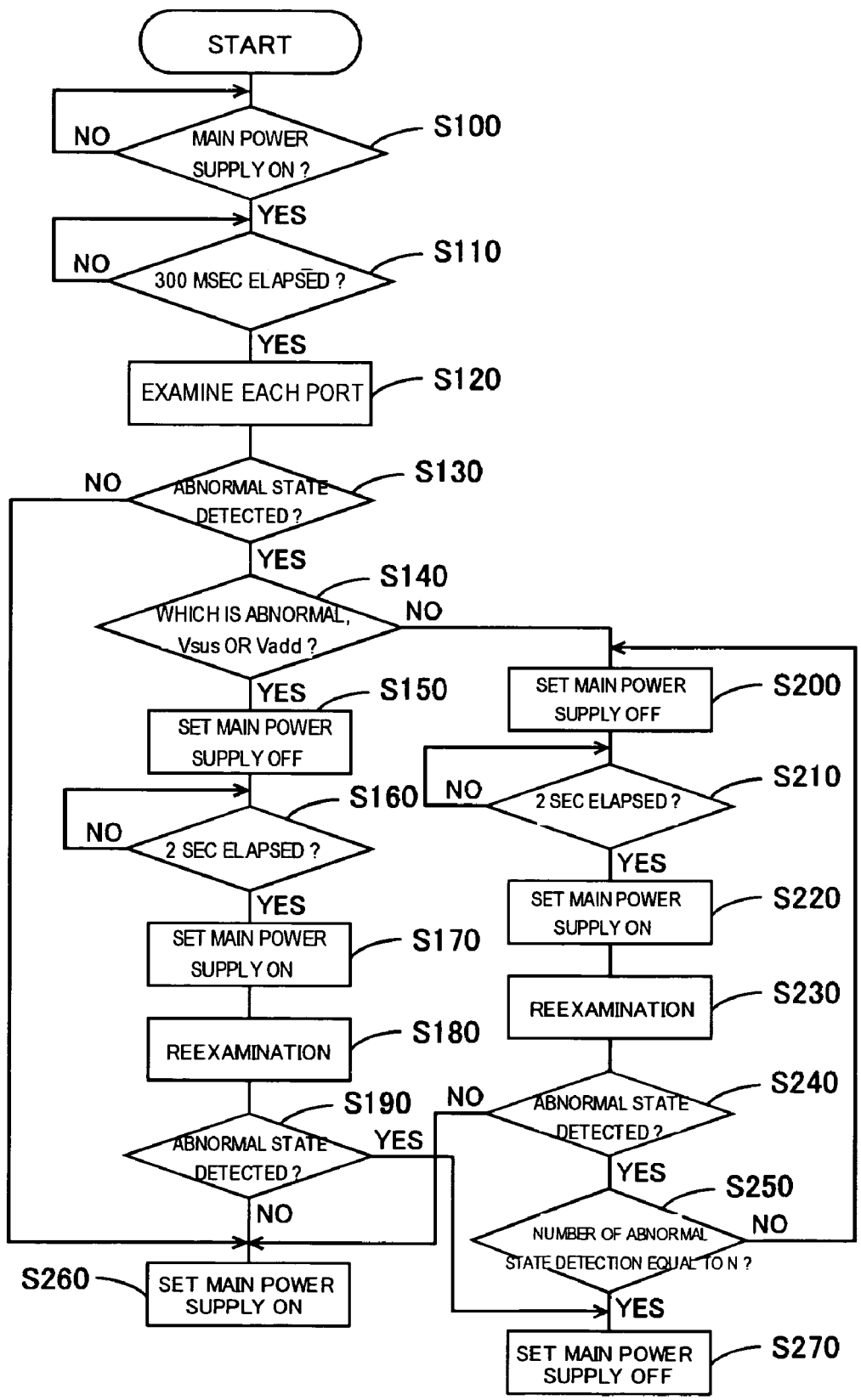
FIG. 4 is an exemplary illustration of a flow chart showing concrete contents of a power supply control processing in accordance with the present invention.

FIG. 4 is a flow chart showing concrete contents of a power supply control processing that the microcomputer 60 performs. As illustrated, at Step S100 the microcomputer 60 determines if the main power supply is ON or OFF. The microcomputer 60 monitors the pushing operation of the main power supply switch by a user and the power-on instruction to the main power supply via a remote-control transmitter. If the pushing operation or a power-on instruction is detected, the microcomputer 60 outputs the switching signal to high H via the port PW1 to set the switch of the relay circuit to ON, and then determines if the main power supply is ON.

If it is determined that the main power supply is ON, the microcomputer 60 determines at step S110 if a certain non-examination period (300 msec for example) has elapsed. The non-examination period is a waiting period that enables all the output voltages from the generation circuits 52 through 54 to stabilized after the main power supply is set to ON so to enable appropriate examination of each port at the next step 120. If it is determined that the non-examination period has elapsed, at step S120 the microcomputer 60 examines the levels of the voltages input from A/D input ports 1 through 6.

The examination at step 120 by the microcomputer 60 determines if the voltages input from A/D input ports 1 through 6 are within the normal ranges, which are preset and stored within the microcomputer for the individual voltages from A/D input ports 1 through 6. For example, if a voltage input to a certain port is within 2.5±1V, the microcomputer determines that the voltage is normal. Moreover, if the voltage is beyond this range, the microcomputer determines that the voltage is abnormal. In addition, the examination related to a voltage input to an A/D port is performed within a certain period (150 msec for example), and if at least one sample value of the voltage within the period is beyond the above-mentioned range, the microcomputer 60 determines that the voltage input to the A/D port is abnormal.

As illustrated in FIG. 4, at step S130, the microcomputer 60 determines if any voltage input to A/D input ports 1 through 6 is abnormal. If it is determined that there is an abnormal voltage values, the microcomputer 60 determines if the abnormal voltage value is the sustaining voltage Vsus or the addressing voltage Vadd, that is, whether the abnormal value is the voltage value obtained via A/D input port 2 or A/D input port 3. If it is determined that the abnormal voltage value is the voltage value obtained via A/D input port 2 or A/D input port 3, then the process at step S150 is executed. Otherwise, if it is determined that the abnormal voltage values is not from Vsus or Vadd, but belong to any one of the examination voltage Vsamp, the first erasing voltage Vset, the second erasing voltage Ve or the scanning voltage Vscan, that is, any one of the voltage values obtained via A/D input port 4 through 6, then the process at step S200 is executed. At steps S120, S130, and S140, the microcomputer 60 functions as a detection unit.

Furthermore, at step S130, if it is determined that there is no abnormal voltage value detected at any of the A/D input ports, then at step S260, the microcomputer will maintain the main power supply ON.

Next, the processes after the flow proceeds along the "Yes" branch at step S140 will be described.

At step S150, the microcomputer 60 outputs the switching signal with L level from port PW1, which sets the switch of the relay circuit 55 to OFF (open switch) in order to disable the main power supply.

In other words, if the sustaining voltage Vsus or the addressing voltage Vadd are abnormal due to some reason, the main power supply is immediately set to OFF. At S150, the relay circuit 55 functions as a power switching circuit and the microcomputer 60 as a switching control unit.

At step S160, the microcomputer 60 determines if a predetermined time (a period between 1 sec to 2 sec, which is assumed to be 2 sec in this embodiment of the present invention) has elapsed after the main power supply was set to OFF. If it is determined that the predetermined time has elapsed, at step 170, the microcomputer 60 outputs the switching signal with H level from port PW1 for setting the switch of the relay circuit 55 to ON (close position) in order to enable the main power supply. In other words, because there is a possibility that the above-mentioned abnormal value occurred due to temporal inflow of noises, the main power supply is enabled again for a reexamination. At steps S160 and S170, the relay circuit 55 functions as a power switching circuit and the microcomputer as a switching control unit.

Enabling the main power supply again allows the microcomputer 60 to get ready to obtain the voltage values output from A/D input ports 1 through 6, and at step S180 reexamine them.

Using the results of the reexamination from step S180, the microcomputer 60 at step S190 determines if an abnormal voltage value is detected from any of the input voltages from A/D input ports. If it is determined that an abnormal voltage value is detected again from a certain A/D input ports from which another abnormal value has already been detected, the flow proceeds to step S270.

It should be noted that before the reexamination at step S180, an abnormal voltage value was detected from the sustaining voltage Vsus input from A/D input port 2 or the addressing voltage Vadd input from A/D input port 3 in the examination at step S120. Therefore, at step S190, if an abnormal value is detected from the same input port again, the flow proceeds to step S270 and the microcomputer 60 outputs the switching signal with L level from port PW1 for setting the switch of the relay circuit 55 to OFF in order to disable the main power supply.

An abnormal voltage value from the sustaining voltage Vsus or the addressing voltage Vadd due to a malfunction of the respective sustaining voltage generation circuit 52 or that of the addressing voltage generation circuit 53, continuously applied to PDP 40 imposes a heavy load on PDP 40, which can likely in the failure of DPD 40. Therefore, in accordance with this embodiment of the present invention, if an abnormal value has been detected from the sustaining voltage Vsus or the addressing voltage Vadd in two consecutive times (the examinations at S120 and S180), no further examinations are performed and the main power supply is maintained to an OFF state. Of course, there is still a possibility that the abnormal voltage value may be a temporary occurrence due to inflow of noises.

At steps S180, S190 and S270, the microcomputer 60 functions as a detection and switching control unit, and the relay circuit 55 as a power switching circuit.

After the process reaches step S270, the main power supply is maintained to OFF unless a user activates the main power supply by the pushing operation of the main power supply switch or the power-on instruction to the main power supply via a remote-control transmitter.

If there is no abnormal voltage value detected from any of the A/D input ports, the microcomputer 60 maintains the main power supply to ON. It should be noted that the examination steps at S120 and S130 detecting an abnormality and the reexamination step at S180 detecting no abnormality of voltage values is an indication of temporary noise within the system, and hence, the main power supply is maintained to an ON state.

Next the processes after the flow proceeds along the "No" branch at step S140 will be described.

The microcomputer 60 performs the same operations at steps S200 through S230 as at steps S150 through S180. It should be noted that prior to the execution of step S230, the microcomputer 60 at steps S120 and S130 determined the existence of an abnormal voltage value on at least one of the A/D input ports.

Using the results of the reexamination at S230, the microcomputer 60 at step S240 determines if an abnormal voltage value is detected from any of the input voltages from A/D input ports.

If it is determined that an abnormal voltage value is detected from the same A/D port as it was determined in the preceding examination, the processing proceeds to step S250. On the other hand, if it is determined that there is no abnormal voltage value detected from any of the A/D input ports, the process proceeds to step S260 and the main power supply is maintained ON.

At S250, the microcomputer 60 determines if the number of times when abnormal voltage values detected from a certain A/D input port reaches a preset number of abnormal voltage value detections. The number of abnormal voltage value detections N is the number of abnormal voltage value detections that is used for making the determination if a malfunction has occurred in a circuit for generating the voltage input to a certain A/D input port, or a circuit has an effect on generation of the voltage. The number of abnormal voltage value detections N can be individually set for the voltage input for each individual A/D input port. In this embodiment of the present invention, the numbers of abnormal voltage value detections N is related to A/D input ports 1, and 4 through 6 are set 3, in common. The abnormal voltage value detection in the examination at step S120 is also counted towards N.

At S250, if it is determined that the number of times when abnormal voltage values from any A/D input port detected do not reach the corresponding number of abnormal voltage value detections N, the process returns to S200, with steps S210 to S250 repeated. On the other hand, for example, if voltages input to A/D input port 1 show abnormal voltage values three consecutive times (once in the examination at S120 and twice in the reexamination at S230), the microcomputer 60 does not perform further reexaminations and the process proceeds to step S270. At step S270, the microcomputer 60 outputs the switching signal with L level from port PW1 for setting the switch of the relay circuit 55 to OFF in order to disable the main power supply.

In other words, if the results of the examinations related to the examination voltage Vsamp, the first erasing voltage Vset, the second erasing voltage Ve and the scanning voltage Vscan at S120 and S230 show abnormal voltage values three consecutive times, the microcomputer 60 sets and maintains the main power supply to OFF.

Even if the results of the examinations related to the examination voltage Vsamp, the first erasing voltage Vset, the second erasing voltage Ve, or the scanning voltage Vscan show abnormal voltage values due to a malfunction of the rectifier circuit 51 or the standby voltage generation circuit 54, these abnormal voltage values would not impose a heavy load to PDP 40. Further, it is unlikely that they would directly cause the failure of PDP 40 when compared with a malfunction of the sustaining voltage Vsus generation circuit or the addressing voltage Vadd generation circuit.

Therefore, in accordance with this embodiment of the present invention, two or more consecutively abnormal voltage values detected from the examination voltage Vsamp, the first erasing voltage Vset, the second erasing voltage Ve, or the scanning voltage Vscan will result in setting OFF and maintaining OFF the main power supply. On the other hand, the detection of abnormal voltage values for addressing voltage Vadd and sustaining voltage Vsus will result in the setting OFF and maintaining OFF the main power supply.

Accordingly, false shut off of the main power supply due to temporal flow of noise is obviated in accordance with the above scheme.

It should be noted that in this embodiment of the present invention, if abnormal voltage values have been detected from the sustaining voltage Vsus or the addressing voltage Vadd twice in a row in the examinations at steps S120 and S180, the main power supply is set to OFF and left OFF afterward. So the number of abnormal voltage value detections N is equal to 2.

Therefore in a practical sense, the microcomputer 60 stores in advance the numbers of abnormal voltage value detections N that are individually set for the voltages input to A/D input ports 1 through 6 in a specified memory area, and determines the number of reexaminations and judges whether a further reexamination is necessary with reference to the relation between each port number and the corresponding number of abnormal voltage value detections N.

It rarely happens, but there is the case where an abnormal value is detected about a voltage from a certain A/D input port in the reexamination at S180 although an abnormal value has been detected about a voltage from another A/D input port in the previous examination (at S120) or another case where an abnormal value is detected about a voltage from a certain A/D input port in the reexamination at S230 although an abnormal value has been detected about a voltage from another A/D input port in the previous examination (at S120 or at S230). In such a case, the judgment that the number of abnormal value detections N is 1 about the voltage from the A/D input port in the last reexamination can be made.

At steps S200, S220, S230, S240 and S270, the microcomputer 60 functions as a detection unit and switching control unit (with the relay circuit) as a power switching circuit.

(4) Conclusion

As described above, in the present invention, the microcomputer 60 takes in a plurality of voltages output from the sustaining voltage Vsus generation circuit 52, the addressing voltage Vadd generation circuit 53, and the standby voltage generating circuit 54 via A/D input ports 1 through 6, and performs examinations to determine abnormal voltage values. If it is determined that there is at least one abnormal voltage value detected, the main power supply is set to OFF and after a predetermined time, the main power supply is set to ON for reexamination. If the number of occurrences for abnormal voltage values for a certain voltage reaches the number of abnormal voltage value detections N set in advance, the main power supply is maintained OFF.

The number for the abnormal voltage value detections N is set to a low value for quick determination of maintaining the main power supply to an OFF state for abnormal voltage values from sustaining voltage Vsus and the Addressing voltage Vadd in order to prevent dame to the PDP 40. On the other hand, the number for the abnormal voltage value detections N is set to a higher value for abnormal voltage values from the examination voltage Vsamp, the first erasing voltage Vset, the second erasing voltage Ve, and the scanning voltage Vscan, which facilitates in determining if the abnormal voltage values are due to in flow of noise or true malfunction because the abnormal voltage values of the Vsamp, Vset, Ve, and Vscan may damage the PDP 40 (if not noise related).

Accordingly, the present invention functions to prevent the apparatus from breaking down and avoids unnecessary shut-OFF of the power supply.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A power supply control device that sets a main power supply OFF when malfunctions occur to portions targeted for examination, comprising:

an addressing voltage generation portion that outputs an addressing voltage to a plasma display panel and a detection unit;

a sustaining voltage generation portion that outputs a sustaining voltage to the plasma display panel and the detection unit, and further outputs a specified examination voltage to the detection unit;

a standby voltage generation portion that outputs a first erasing voltage, a second erasing voltage, and a scanning voltage to the plasma display panel and the detection unit;

the detection unit receives the addressing voltage, the sustaining voltage, the specified examination voltage, the first erasing voltage, the second erasing voltage, and the scanning voltage, and determines if any of the received voltages have abnormal values when the main power supply is set to ON;

a power switching circuit that sets the main power supply to OFF when the detection unit detects at least one abnormal value from any of the voltages and sets the main power supply to ON again after a predetermined time; and a switching control unit that controls the power switching circuit:

the number of abnormal value detections that is individually set for the addressing voltage, the sustaining voltage, the specified examination voltage, the first erasing voltage, the second erasing voltage and the scanning voltage is stored in advance, and is used to determine if a malfunction has occurred in a corresponding portion targeted for examination; and if the number of abnormal values detected from one of the addressing voltage, the sustaining voltage, the specified examination voltage, the first erasing voltage, the second erasing voltage and the scanning voltage reaches the number of abnormal value detections set, the power switching circuit is prohibited from setting the main power supply to ON again after a predetermined time has elapsed since the power switching circuit set the main power supply to OFF;

the addressing voltage and the number of abnormal value detections related to the sustaining voltage that are stored in the switching control unit is set to 2;

the number of abnormal value detections related to the specified examination voltage, the first erasing voltage, the second erasing voltage and the scanning voltage that are stored in the switching control unit is set to a number greater than 2.

2. The power supply control device according to claim 1, wherein the detection unit obtains the voltages from the output generation portions that have been individually divided and stepped down.

3. A power supply control device, comprising:

a microcomputer that receives a plurality of input voltages, and generates a plurality of output signals;

a power switching circuit that is controlled by a first switching signal of the microcomputer to enabling a flow of supply of power, and by a second switching signal of the microcomputer to disable the flow of supply of power;

a sustaining voltage generation module that outputs a sustaining voltage to a plasma display panel and to a first input of the microcomputer, and further, outputs a specified examination voltage to a second input of the microcomputer;

an addressing voltage generation module that outputs an addressing voltage to the plasma display panel and to a third input of the microcomputer;

a standby voltage generation module that outputs a first erasing voltage, a second erasing voltage, and a scanning voltage to the plasma display panel;

the standby voltage generation module further outputs the first erasing voltage, the second erasing voltage, and the scanning voltage to a respective fourth input, fifth input, and sixth input of the microcomputer;

the microcomputer determines if a power-ON instruction is provided;

if it is determined that a power-ON instruction is provided, it is then determined if a main power supply is ON; if it is determined that the main power supply is ON, the microcomputer outputs the first switching signal to the power switching circuit to enable the flow of supply of power, and waits for a predetermined stabilization time for the plurality of input voltages to stabilize before an examination of the received plurality of input voltages is commenced;

if it is determined that the predetermined stabilization time has elapsed, the microcomputer commences the examination of the plurality of input voltages to the respective first, second, third, fourth, fifth, and sixth inputs, and determines if the plurality of input voltages are within a preset normal range;

if it is determined that the plurality of input voltages are within the preset normal range, the microcomputer maintains the flow of supply of power;

if it is determined that any one or more of the plurality of input voltages have abnormal values that are not within the preset normal range, it is then determined if one or both of the sustaining voltage and the addressing voltage have abnormal values, and a reexamination of the plurality of input voltages is commenced, including:

the microcomputer outputs the second switching signal to the power switching circuit to disable the flow of supply of power, waits for a predetermined time, and after the predetermined time has elapsed, the microcomputer outputs the first switching signal to the power switching circuit to enable the flow of supply of power, and commences a reexamination of the plurality of input voltages to the respective first, second, third, fourth, fifth, and sixth inputs;

if it is determined that any one or more of the plurality of input voltages have abnormal values that are not within the preset normal range during the reexamination, and if during the examination one or both of the sustaining voltage and the addressing voltage were determined to have abnormal values, the microcomputer outputs the second switching signal to the power switching circuit to disable the flow of supply of power;

if it is determined that any one or more of the plurality of input voltages have abnormal values that are not within the preset normal range during the reexamination, and if during the examination the sustaining voltage and the addressing voltage were determined to have normal values, then it is determined if the number of abnormal values detected exceeds a predetermined count;

if it is determined that the number of abnormal values detected does exceed a predetermined count, the microcomputer outputs the second switching signal to the power switching circuit to disable the flow of supply of power; otherwise, the microcomputer repeats the reexamination process.

* * * * *